March 3, 1964  D. W. GRIMM ETAL  3,123,120
FLOATING ANCHOR NUT
Filed Oct. 12, 1960
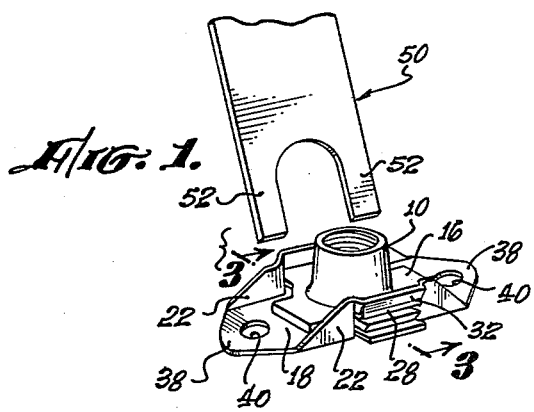
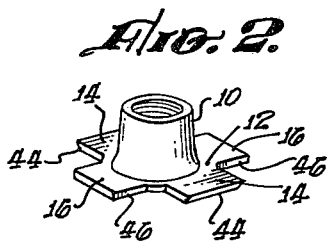
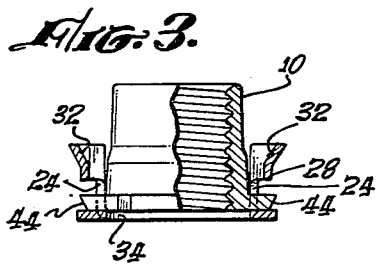
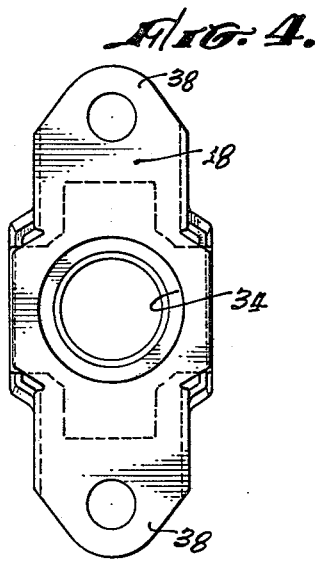
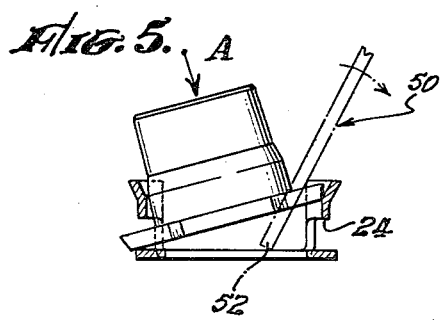
DAVID W. GRIMM,
JACK RATH,
INVENTORS.
BY *T. L. Slam*
ATTORNEY United States Patent Office 3,123,120
Patented Mar. 3, 1964

3,123,120
FLOATING ANCHOR NUT
David W. Grimm and Jack Rath, Pico Rivera, Calif., assignors to Kaynar Mfg. Co., Inc., Pico Rivera, Calif., a corporation of California
Filed Oct. 12, 1960, Ser. No. 62,152
3 Claims. (Cl. 151—41.7)

The present invention relates to fasteners of the type known as floating anchor nuts and in which a nut is held by an anchor plate or basket so that the nut is allowed to float relative to the basket. More specifically, the invention relates to floating anchor nuts wherein the nut elements may be removed and replaced, if desired, without removing the anchor plate or basket from its support.

Floating anchor nuts of the type under discussion have been used as "blind" fasteners for some time, this being particularly true in the aircraft and missile industries. Such nuts normally comprise an anchor plate, sometimes called a "basket," which is riveted or otherwise permanently fastened to the "blind" side of a supporting member. The basket generally has an aperture in its base web surface, the aperture being oversize relative to the size of bolt intended to be inserted therethrough, and is constructed to floatingly retain a nut element over said aperture. While some floating anchor nuts are designed to permanently retain the nut element and require separation of the entire assembly if the nut element requires replacement for any reason, many arrangements have been devised whereby the nut element may be conveniently replaced. Such arrangements have sometimes included a separate, removable retainer member holding the nut element in the basket and have been disadvantageous in being complex and costly and in having unduly great weight and bulk. More desirable floating anchor nut arrangements, permitting removal and replacement of the nut element, have not included third pieces (retainer members) but have depended upon a relationship between the nut element and the basket element to provide a removability feature.

Such devices are, in general, disadvantageous in several respects. In some instances they must either sacrifice strength (resistance to torque forces on the nut or forces tending to push the nut out of the basket) or must be unduly heavy or bulky, which is disadvantageous in aircraft and missile construction. Moreover, some designs require the application of excessive forces to remove or replace the nut element.

This invention provides an improved floating anchor nut assembly which permits easy removal and replacement of the nut element, as desired, in an arrangement of minimum weight and bulk and wherein resistance to push-out forces is increased by the application of such forces so that the assembly compares favorably in strength with floating anchor nuts not having the removability feature. This is accomplished by providing relatively rigid, yet resilient, side flanges on the basket element, said side flanges having slots for retention of the base flanges of the nut element, the tops of the slots being defined by resilient inwardly and downwardly sloped wall surfaces so that said surfaces are cammed outwardly as a nut element is inserted and snap over the tops of the base flanges of the nut element as assembly is completed. In response to push-out forces, such wall surfaces tend to increase their overhang over the base flanges rather than to be turned aside to permit separation of the nut. In cooperation with the foregoing, the base flange of the nut element is so formed as to cooperate with a simple tool and with the resilient side flanges to effect easy removal of the nut from the basket without damage to the parts.

It is, therefore, an object of the present invention to provide improved floating anchor nut assemblies of the type which permit removal and replacement of the nut elements.

Another object of the present invention is to provide means whereby a nut element may be quickly and securely fastened to an anchor plate in such a manner that, by using a simple tool, the nut element can be readily removed without destruction or distortion of any of the parts.

Yet another object of the present invention is to provide a floating anchor nut construction wherein forces tending to cause vertical movement of the nut relative to the basket will cause the nut to be more completely restrained from such vertical movement.

Still another object of the present invention is the provision of a floating anchor nut assembly wherein the resilience of the basket element is utilized to facilitate assembly and disassembly while inhibiting accidental disassembly.

A still further object of the present invention is to provide a floating anchor nut assembly wherein camming surfaces on the nut element and on the basket element cooperate to facilitate assembly and disassembly, portions of the same surfaces serving to resist separation due to forces tending to push the nut element out of the basket.

Further objects and advantages of this invention will become evident as the description proceeds, and from an examination of the accompanying drawing which illustrates one embodiment of the invention and in which similar numerals refer to similar parts throughout the several views.

FIGURE 1 is a perspective view of a floating anchor nut assembly according to the present invention showing also the operating end of a nut removing tool adapted to be used therewith;

FIGURE 2 is a perspective view of the nut element, per se;

FIGURE 3 is a cross-sectional view taken along the line 3—3 of FIGURE 1;

FIGURE 4 is a bottom view of the assembly of FIGURE 1 in enlarged scale; and

FIGURE 5 is a sectional view similar to FIGURE 3 but showing the parts in the process of assembly or disassembly, showing the cooperation of the nut removing tool in dotted lines.

Referring now to the drawings, which illustrate one embodiment of the present invention, it may be seen that the floating anchor nut assembly is comprised of two pieces, a nut element and a basket element.

The nut comprises a threaded barrel 10 having an integral base flange 12. The base flange 12 is so shaped as to provide integral outwardly extending pairs of opposed lugs 14 and 16 disposed perpendicularly to one another in the plane of the base flange to present a flat, generally cruciform appearance.

As will be explained in detail hereinafter, the shapes, sizes and other details of lugs 14 and 16 may be varied considerably for various purposes but at this point, discussion will be limited to the details of lugs 14 as shown in the drawing.

Preferably, the outer ends of the lugs 14 are bevelled upwardly, as at 44, for cooperation with similarly slanted parts on the basket element in facilitating assembly of the parts as will be later described. This feature, although greatly advantageous, is not essential to the practice of this invention in its broadest aspects.

The basket is a one-piece element preferably formed by a stamping operation and is made of resilient material. It comprises a base web 18 having an oversize bolt admission opening 34 and longitudinally extending attachment ears 38 having rivet openings 40 therein. Base web 18 has side flanges 22 extending upwardly from the longitudinal edges thereof. The side flanges 22 have slots 24 cut therein, the slots having a height somewhat greater than the thickness of the base web to provide for vertical floatability of the nut element in the basket and a length somewhat greater than the breadth of the lugs 14 to permit longitudinal floatability of the nut element. Above the slots 24, the side flanges are tapered generally outwardly and upwardly to provide inclined surfaces 32, and the side flanges in this area may be disposed in the plane of the side flanges or laterally outwardly thereof, as shown in the illustrative embodiment. Obviously, when the upper edges of the slots 24 are displaced outwardly of the plane of the flanges 22, upward pressure by the lugs 14 produces a torque moment about the fold line between flanges 22 and base web 18. That torque moment is in such direction that the flanges 22 tend to bend inwardly toward nut 10. Preferably, the shaping of the upwardly and outwardly inclined portions of the flanges 22 is such that the lower parts or bottoms thereof are perpendicular to the base web 18 so that surfaces of the upper edges of the slots 24 are parallel to the base web, as at 28, and therefore provide maximum surface contact with the retaining lugs 14 on the nut element as shown in the drawing.

Assembly of the above described parts is accomplished by insertion of one retaining lug 14 of a nut element in a slot 24 and by pressing downardly on the nut element as indicated by the arrow "A" in FIGURE 5. In response to such pressure, the opposite lug 14 rides down the related inclined side wall 32 and progressively forces the resilient material of the side walls outwardly until the lateral edge of the said opposite lug snaps into its slot 24, whereupon the resilience of the material causes return of the side walls to their original position, in which the tops of slots 24 overlie the lateral ends of the retaining lugs. It should be understood that lateral float of the nut in the basket is limited in either direction by abutment of the nut barrel with the side flanges, in the illustrated embodiment, and that the lugs 14 are of a length to engage in the slots 24 in the extreme lateral positions of the nut element. In any case, the lugs 14 should be just long enough to retain the nut in the basket, without regard to how the lateral float is limited.

An important improvement resulting from the above described arrangement is that forces tending to push the nut element upwardly out of the basket are effective to cause inward bending of the side flanges 22 above the slots 24, thus increasing the overhang over the retaining lugs 14 and improving the resistance to separation of the parts due to such forces.

As previously mentioned, retaining lugs 14 may have their edges bevelled, as at 44, whereby flat surfaces rather than sharp edges are provided for cooperation with the similarly slanted side walls 32, the effect being a more gradual camming of the side walls by the edges 44 as a nut element is pressed into the basket.

Reference is now made to the lugs 16 and to their function. Lugs 16 extend in a direction longitudinally of the basket and are of a lateral width somewhat less than the distance between the side flanges of the basket so that they do not interfere with lateral floatability of the nut element in the basket. The primary function of lugs 16 is to cooperate with an appropriate tool in effecting removal of the nut from the basket. FIGURES 1 and 5 illustrate one example of such a tool and shows how it operates. Any simple tool having a pair of tines spaced apart a distance sufficient to clear the nut barrel at its bottom and to engage the lugs 16 could be used. As shown in FIGURES 1 and 5, a tool, generally designated by the reference numeral 50 and having a pair of spaced tines 52, is positioned with the tines between the edges 46 of lugs 16 and side wall portions 32. When downward prying pressure is applied on the handle of the tool, the nut element is first pushed to its extreme position at the opposite side of the basket. Continued application of pressure then flexes side wall portions 32 and releases the lug 14 adjacent the tool from its slot 24 to snap the nut element out of the basket. Reassembly or replacement may subsequently be effected as previously described.

Reference is now again made to the base flange configuration which has been previously described as generally flat and cruciform in planform and as having retaining lugs 14 and removal lugs 16. The shapes and nature of lugs 14 and 16 are widely variable depending on the basket dimensions and desired usages. Thus, lugs 14 and 16 might be of identical dimensions and both provided with bevelled edges 44 so that installation could be in any position. Conversely different lug widths and lengths could be arranged to allow use of the same nut element with different basket designs. It is also pointed out that any appropriate length selection for the lugs 16, in any particular usage, can result in the edges of the lugs engaging the side flanges 22 in extreme torque conditions to assist the lugs 14 and slots 24 in bearing torque loads.

From the above, it may be seen that the present invention provides floating anchor nut assemblies of simple, two-piece construction, adapted to permit easy assembly and disassembly of the nut element from the basket element by use of a simple tool. Moreover, this invention provides such constructions in which high push-out and torque-out characteristics are preserved despite the removability feature and in which permanent distortion of the parts or the application of excessive forces are not necessary in the installation or removal of the nut elements.

Obviously, as previously stated, many variations and modifications of the invention may be practiced other than those illustrated in the drawing and discussed specifically herein. It is therefore to be understood that this invention is not to be limited by the specific details described herein but rather by the scope and language of the appended claims.

What is claimed is:

1. An anchor nut assembly comprising a basket and a nut element floatingly retained in the basket, the nut element comprising a threaded nut barrel and a pair of laterally outwardly extending lugs integral with said nut barrel, said basket comprising a single piece of resilient material having a base web, a bolt accommodating aperture in the base web, side flanges integral with the base web and extending upwardly therefrom and substantially perpendicular thereto and having free upper edges, slots provided in the side flanges to accommodate said lugs, said slots being spaced apart a distance less than the distance between the outer edges of the lugs on the nut, the length and width of said slots being greater than the corresponding dimensions of said lugs, whereby the nut element is floatingly retained in the basket, the portion of said side flanges overlying the slots being outwardly displaced from the plane of said flanges such that the lower edge of said portion is outwardly displaced from the joining fold line between the flanges and base web, whereby forces exerted against the nut element by a bolt or stud threaded into said nut element tend to push the said portion of the side flanges which overlie the said slots upwardly and inwardly to increase the overhang of the side flanges relative to the said nut base to more securely retain the nut element in the basket.

2. An anchor nut assembly according to claim 1 further characterized in that portions of said side flanges above said slots extend obliquely upwardly and outwardly, the ends of said lugs defining bevelled edges, whereby flat surfaces rather than sharp edges are provided for cooperation with the resilient slanted side flanges to effect a gradual camming of the side flanges as the nut element is inserted into the basket.

3. An anchor nut assembly according to claim 2 further characterized in that the upwardly and outwardly inclined portions of the side flanges which overlie the slots have bottom portions perpendicular to the plane of the base web, whereby maximum surface contact is effected with the said one pair of opposed lugs which project into the said slots.

References Cited in the file of this patent
UNITED STATES PATENTS

| | | |
|---|---|---|
| 2,299,158 | Luce | Oct. 20, 1942 |
| 2,443,752 | Tinnerman | June 22, 1948 |
| 2,459,034 | Kruger | Jan. 11, 1949 |
| 2,815,789 | Hutson | Dec. 10, 1957 |

UNITED STATES PATENT OFFICE
CERTIFICATE OF CORRECTION

Patent No. 3,123,120 March 3, 1964

David W. Grimm et al.

It is hereby certified that error appears in the above numbered patent requiring correction and that the said Letters Patent should read as corrected below.

Column 5, line 13, for the claim reference numeral "2" read -- 1 --.

Signed and sealed this 15th day of September 1964.

(SEAL)
Attest:

ERNEST W. SWIDER
Attesting Officer

EDWARD J. BRENNER
Commissioner of Patents